United States Patent [19]
Dumbrell

[11] Patent Number: 5,133,175
[45] Date of Patent: Jul. 28, 1992

[54] SAFETY FLAP FOR POWER-OPERATED LAWNMOWER

[76] Inventor: James A. Dumbrell, 1103 N. Argonne Ave., Sterling, Va. 22170

[21] Appl. No.: 694,091

[22] Filed: May 1, 1991

[51] Int. Cl.$^5$ .............. A01D 34/68; A01D 75/20
[52] U.S. Cl. .................. 56/17.4; 56/320.2; 56/DIG. 20
[58] Field of Search ........... 56/17.4, 17.5, 320.1, 56/320.2, 255, 295, DIG. 20, DIG. 24

[56] References Cited

U.S. PATENT DOCUMENTS

| D. 178,634 | 9/1956 | Butler . | |
|---|---|---|---|
| D. 232,184 | 7/1974 | Cognata . | |
| 2,726,503 | 12/1955 | Phelps | 56/320.2 X |
| 2,857,727 | 10/1958 | Cole | 56/320.2 |
| 2,973,613 | 3/1961 | Hagedorn . | |
| 3,226,920 | 1/1966 | Gilbertson | 56/255 |
| 3,391,524 | 7/1968 | Nickoloff et al. | 56/320.2 |
| 3,759,023 | 9/1973 | Comer | 56/320.1 |
| 4,466,235 | 8/1984 | Cole | 56/320.2 X |
| 4,597,251 | 7/1986 | Cornellier | 56/17.6 |
| 5,040,364 | 8/1991 | Deegan | 56/320.2 |

Primary Examiner—Terry Lee Melius
Attorney, Agent, or Firm—Parkhurst, Wendel & Rossi

[57] ABSTRACT

A safety device for mowing equipment is disclosed which, when used in combination with a mower housing that controls the random direction of propelled objects, will further control the direction and distance over which the objects are propelled, while not restricting the efficient discharge of grass clippings from the mower housing. More specifically, the invention provides a safety device that is adjustable, without presenting an inconvenience or hazard to the equipment operator, in the degree to which it will restrict the direction and distance of propelled objects.

20 Claims, 3 Drawing Sheets

SAFETY FLAP FOR POWER-OPERATED LAWNMOWER

FIELD OF THE INVENTION

The invention relates generally to lawn mowing equipment. More specifically, the invention relates to safety devices for power-operated lawn mowing equipment that prevent objects from being thrown from the mowing equipment at high velocities during a mowing operation.

BACKGROUND OF THE INVENTION

Power operated lawn mowing equipment, especially those of the rotating blade type, present hazards when small objects are present in the area to be mowed. Specifically, small objects struck by the rotating blades can be propelled out of the mower housing randomly and at velocities sufficient to inflict serious damage to persons and/or property located as far as twenty or thirty feet away from the mowing equipment.

Various attempts have been made to mitigate this hazard in various ways, usually through the use of some type of deflection mechanism. U.S. Pat. No. 178,634 issued to Butler, for example, shows a typical design for a lawnmower housing which controls the direction of propelled objects by deflecting them through a side chute in the housing. Such designs, however, have several disadvantages including the fact that although the chute restricts the direction of propelled objects, it does not control the velocity or distance over which objects can be thrown. In addition, the chute protrudes several inches from the surface of the mower housing, thereby preventing the mower from working directly adjacent to trees, fences, and other stationary objects.

One solution to the protrusion of the chute is to make the chute movable through the use of a hinge. U.S. Pat. No. 232,184 issued to Cognata, for example, discloses a combined housing deflector and motor shroud arrangement having a side chute connected to the housing by a hinge. The hinged chute can be folded back to allow the mower to work near stationary objects, but presents an inconvenience to the mower operator. When the mower approaches a stationary object, the operator must stop, walk to the side of the mower, lift the chute, mow around the stationary object, stop again, and replace the chute into its original position. Whether lifted or in position, the hinged chute generally does not control the velocity or distance of propelled objects.

The hinged chute is utilized in most commercial mowing equipment currently available, but because of the inconvenience it presents, many users, particularly lawn-care professionals who use mowers daily, either remove the chute altogether, fail to lower the chute to its proper position or replace the chute with a hinged flap which hangs flush over the side opening of the mower housing. This vertical flap allows the mower to work close to stationary objects and restricts objects from being thrown out of the housing but also adversely impacts the discharge of grass clippings. Another disadvantage of the vertical flap is that it is flush with the housing skirt and the mower operator's hand or foot comes within a half-inch of the rotating blades when lifting or closing the flap to clear clogged grass clippings, which represents a serious safety hazard to the operator.

Another approach to restricting random projection of objects from lawnmower housings is disclosed in U.S. Pat. No. 3,759,023 issued to Comer. A safety shield which rests on the ground and provides a total enclosure around the mower is provided. The provision of a discharge opening is optional. This configuration presents disadvantages similar to those presented by the aforementioned housing deflector, chute, and flap in that the discharge opening is either totally open, thereby allowing discharge of objects, or totally closed, thereby restricting discharge of grass in addition to restricting discharge of objects.

SUMMARY OF THE INVENTION

In view of the problems associated with conventional mowing equipment described above, it is an object of the present invention to provide a safety device for mowing equipment which, when used in combination with a mower housing that controls the random direction of propelled objects, will further control the direction and distance over which the objects are propelled, while not restricting the efficient discharge of grass clippings from the mower housing. In addition, the invention provides a safety device that is adjustable, without presenting an inconvenience or hazard to the equipment operator, in the degree to which it will restrict the direction and distance of propelled objects.

Further objects and advantages of the invention are to provide a safety device which can be installed either during or after the manufacture of the lawnmower and is simple to install and operate. Still further objects and advantages of the invention will become apparent from consideration of the ensuing description of the preferred embodiment of the invention and the accompanying drawings.

In a preferred embodiment, a safety device is provided that includes a front mounting bracket and a rear mounting bracket; at least one guide rail coupled to the front mounting bracket and the rear mounting bracket; a slide plate attached to the guide rail in a manner to permit movement of the slide plate along the guide rail; a deflector plate coupled to the slide plate; and a control mechanism for controlling the movement of the slide plate along the guide rail.

BRIEF DESCRIPTION OF THE DRAWINGS

With the above as background, reference should now be made to the following detailed description of the preferred embodiment of the invention and the accompanying drawings in which.

DETAILED DESCRIPTION OF THE PREFERRED EMBODIMENT

Figure 1:
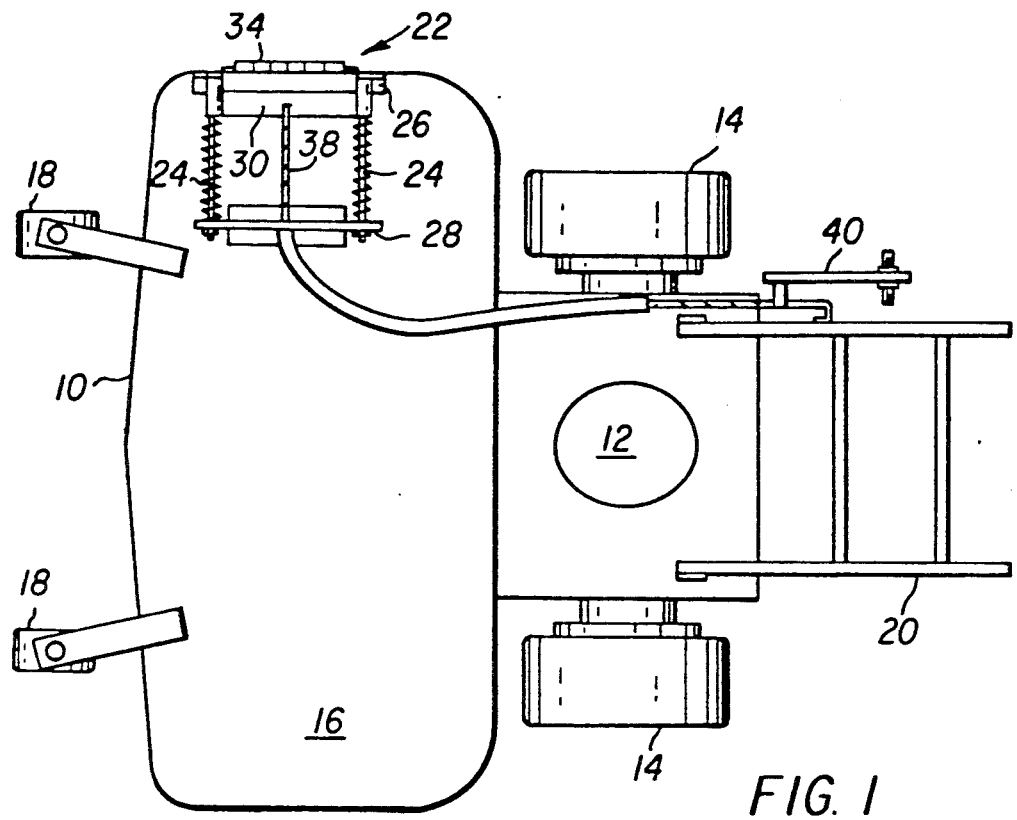
FIG. 1 is a top view of a industrial grade mower incorporating the safety device of the present invention.

Referring now to FIG. 1, an industrial grade mower 10 is shown including an engine 12, drive wheels 14, a blade housing 16, front wheels 18, a handle 20, and a discharge safety device 22 located at a side opening (not shown) in the blade housing 16. The basic structure of the industrial grade mower 10, absent the discharge safety device 22, is conventional and will not be discussed in detail. It is sufficient for an understanding of the invention to simply note that the blade housing 16 covers rotating cutting blades and the grass clippings from the cutting operation are discharged through the side opening in the housing.

Figure 2:
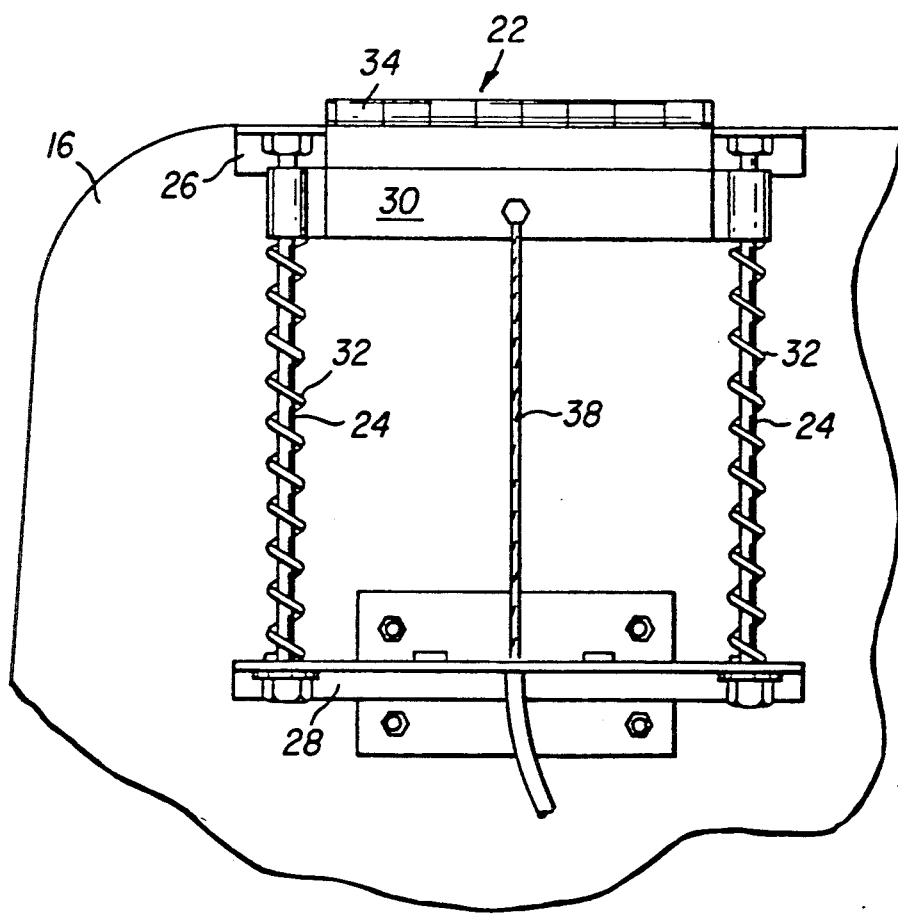
FIG. 2 is a top view of the safety device illustrated in FIG. 1.
Figure 3:
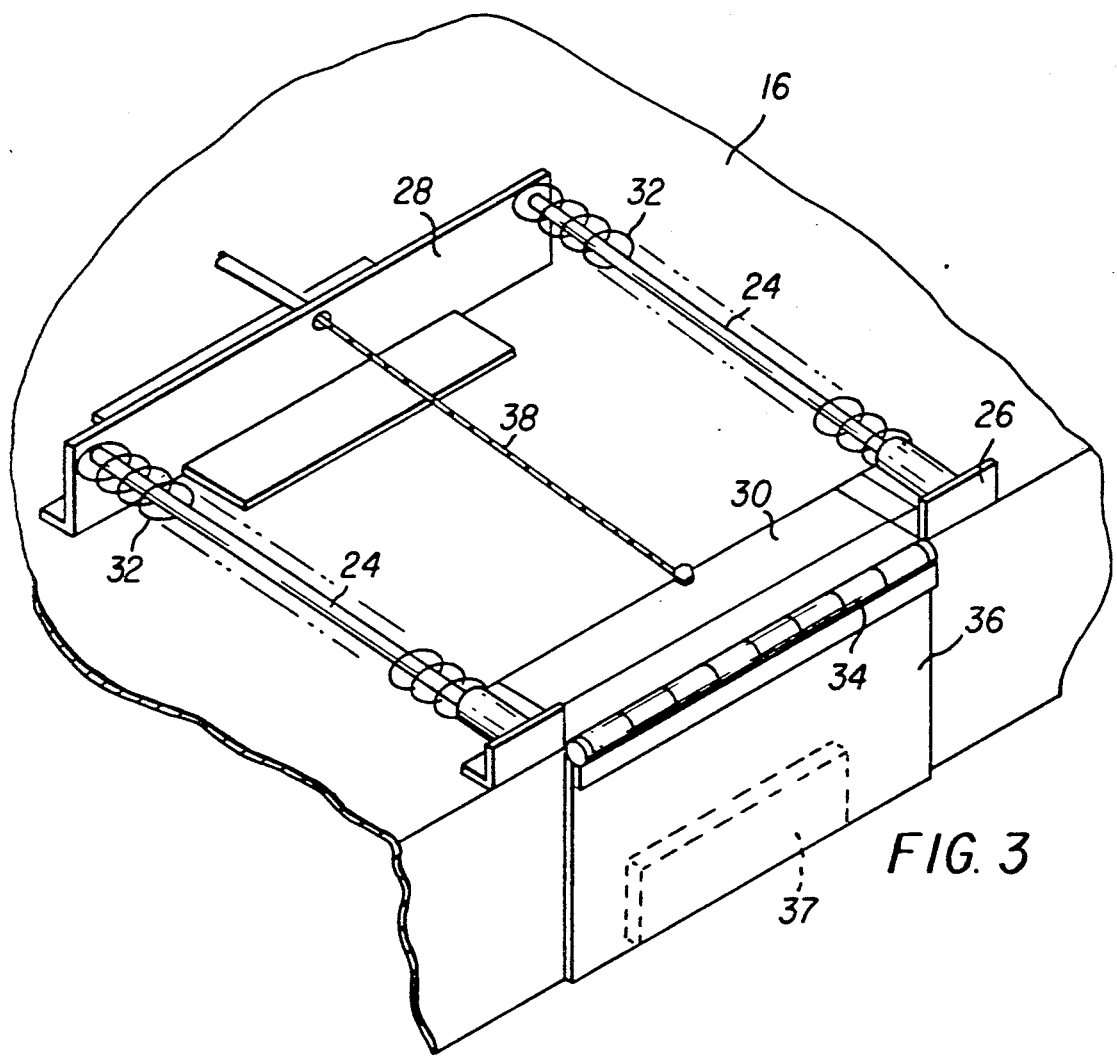
FIG. 3 is a close-up perspective side view of the safety device illustrated in FIG. 1.

The safety device 22 includes two guide rails 24 that are attached to a front mounting bracket 26 and a rear mounting bracket 28 which are attached to the blade housing 16 as shown in FIG. 2. The rear mounting bracket 28 is preferably taller than the front mounting bracket 26 so that the guide rails 24 are arranged at an angle with respect to the top surface of the blade housing 16 as shown in FIG. 3. It should be noted, however, that other arrangements may also be employed depending on the structure and shape of the blade housing 16. For example, the guide rails 24 could be mounted substantially horizontal or even with the rear mounting bracket 28 lower than the front mounting bracket 26. A slide plate 30 is located on the guide rails 24 in a manner to permit free movement of the slide plate 30 along the guide rails 24. Biasing springs 32 are also located on the guide rails 24 to normally bias the slide plate 30 towards the front bracket 26. The slide plate 30 includes a hinge 34 that is coupled to a deflector plate 36. The hinge 34 is preferably spring loaded to prevent the deflector plate 36 from being flung open or flipped up if a heavy object strikes the deflector plate 36. Alternatively, a weight 37 —shown in phantom in FIG. 3— can be provided on the bottom of the deflector plate 36 to counteract the force of the heavy object, thereby reducing the possibility of the deflector plate 36 being flung open. A control cable 38 is also preferably coupled to a central rear portion of the slide plate 30. The opposite end of the control cable 38 is coupled to an operator control 40 located on the handle 20 of the industrial grade mower 10.

Figure 4A:
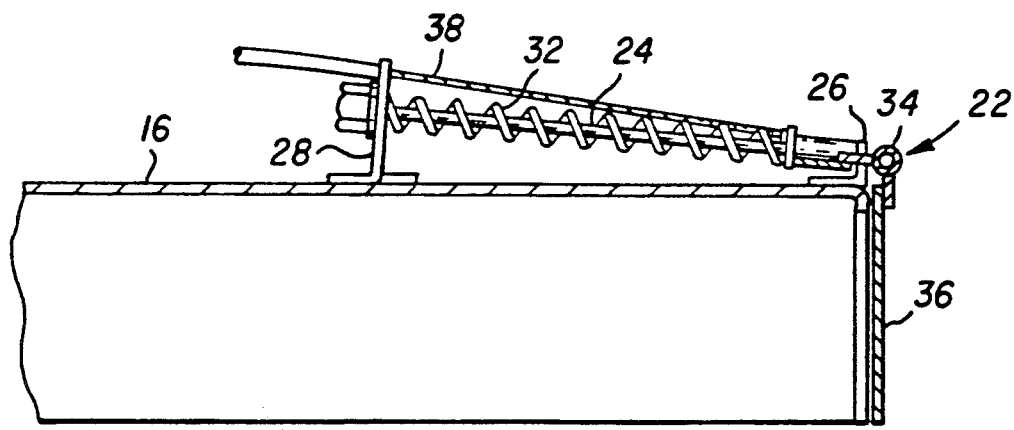
FIGS 4A–4D illustrate a side view of the safety device during various modes of operation.
Figure 4B:
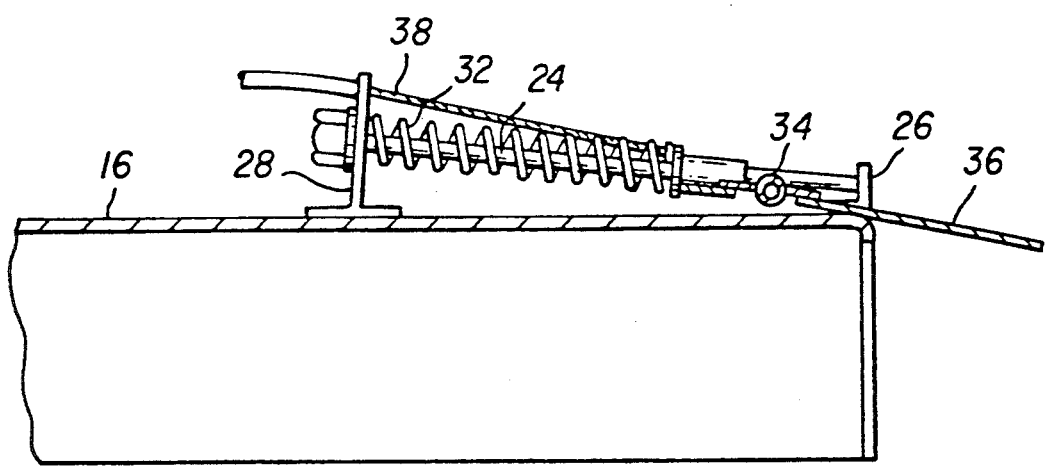
Figure 4C:
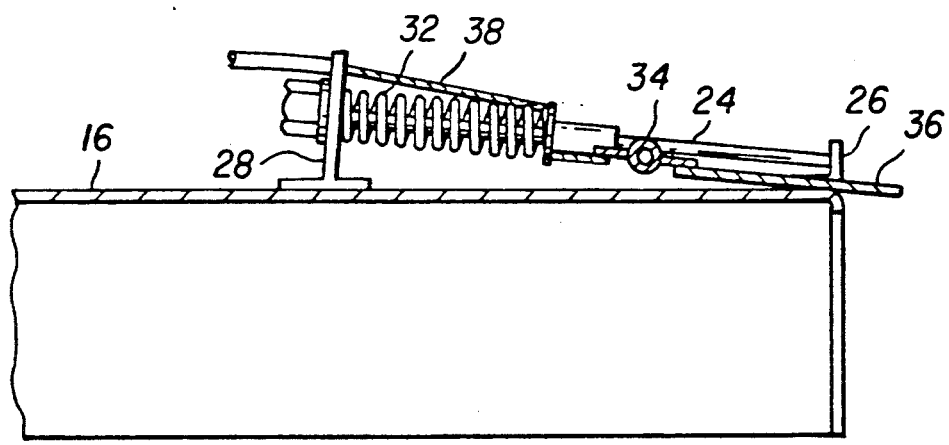
Figure 4D:
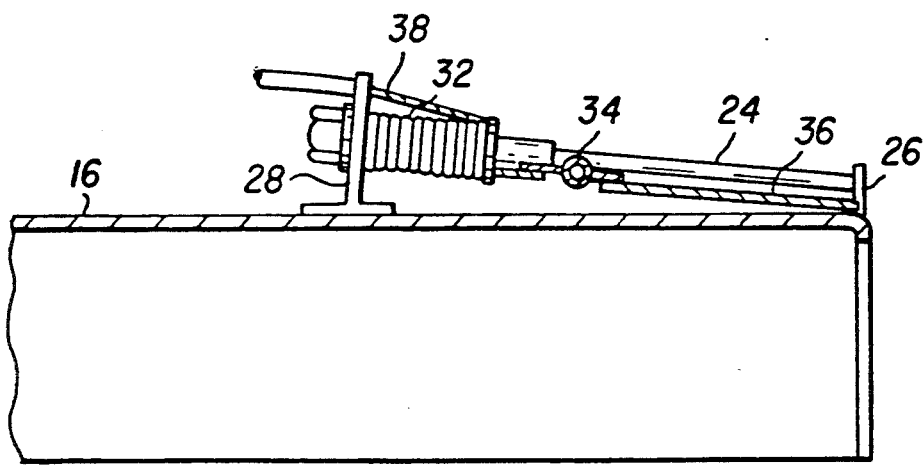

The operation of the safety device 12 will now be discussed with reference to FIGS. 4A-4D. The operation of the operator control 40 causes the control cable 38 to pull the slide plate 30 back towards the rear mounting bracket 28 in opposition to the biasing force asserted by the biasing springs 32. Movement of the slide plate 30 also causes the deflector plate 36 to be pulled up and back from an initially lowered position that totally obstructs the side opening of the blade housing 16 as shown in FIG. 4A, through intermediate positions that partially obstructs the side opening as shown in FIG. 4B and 4C, to a full open position in which the side opening is totally unobstructed as shown in FIG. 4D. Thus, the operator can adjust the location of the deflector plate 36 to fully obstruct the side opening, leave the side opening totally unobstructed, or at any location therebetween to partially obstruct the side opening. In addition, the unique design of the safety device 12 insures that the deflector plate 36 is located as close as possible to the side of the blade housing 16 at all times. For example, in the full open position, the deflector plate 36 is entirely pulled back over the blade housing 16.

The safety device 12 provides many advantages over the conventional devices previously described. The distance and velocity at which objects are discharged from the side opening can be easily controlled by varying the degree of obstruction of the side opening with the deflector plate 36. Protrusion of the deflector plate 36 from the side of the blade housing is minimized to permit easy mowing around obstructions. The hand operated control keeps the operator away from the hazardous side opening and permits the operator to control the safety device without stopping the mower.

The invention has been described with reference to certain preferred embodiments thereof. It will be understood, however, that modifications and variations are possible within the scope of the appended claims. For example, although the use of bias springs is preferred to aid in the closing of the housing, the bias springs can be eliminated if the control cable is sufficiently stiff to push the slide plate toward the front mounting bracket. The deflection plate can also consist of a series of hinged plates, similar to segmented garage door, if desired. The operator control also does not need to be located on the handle of the mower, although this is the preferred location. Similarly, other devices, such as rods, may be employed to pull back the slide plate in place of the control cable or structure of the mounting brackets may be varied. Finally, various mounting structures may be employed to locate the guide rails. For example, a single bracket having extended arms in the form of a "Y" can be used to hold the guide rails rather than a separate front and rear mounting bracket.

What is claimed is:

1. A safety device for mowing equipment a housing having a discharge opening, said safety device comprising:
    a front mounting bracket and a rear mounting bracket that when mounted on the mowing equipment are attached to the housing such that the front mounting bracket is adjacent to the discharge opening;
    at least one guide rail coupled to the front mounting bracket and the rear mounting bracket;
    a slide plate attached to the guide rail in a manner to permit movement of the slide plate along the guide rail;
    a deflector plate coupled to the slide plate, wherein the defector plate moves in response to the movement of the slide plate along the guide rail; and
    control means for controlling the movement of the slide plate along the guide rail, wherein the movement of the slide plate permits the position of the deflector plate to be adjusted over the discharge opening when the safety device is mounted on the mowing equipment.

2. A safety device as claimed in claim 1, wherein the control means includes a control cable having one end attached to the slide plate and an opposite end attached to an operator control.

3. A safety device as claimed in claim 1, further comprising a bias spring mounted on the guide rail, wherein the bias spring contacts the rear mounting plate and the slide plate in order to apply a bias force against the slide plate that urges the slide plate toward the front mounting bracket.

4. A safety device for mowing equipment including a housing having a discharge opening, said safety device comprising:
    a front mounting bracket and a rear mounting bracket that when mounted on the mowing equipment are attached to the housing adjacent to the discharge opening;
    at least two substantially parallel guide rails coupled to the front mounting bracket and the rear mounting bracket;
    a slide plate attached to the guide rails in a manner to permit movement of the slide plate along the guide rails;

a deflector plate coupled to the slide plate, wherein the deflector plate moves in response to the movement of the slide plate along the guide rail; and control means for controlling the movement of the slide plate along the guide rails, wherein the movement of the slide plate permits the position of the deflector plate to be adjusted over the discharge opening when then safety device is mounted on the mowing equipment.

5. A safety device for mowing equipment including a housing having a discharge opening, said safety device comprising:

a front mounting bracket and a rear mounting bracket that when mounted on the mowing equipment are attached to the housing adjacent to the discharge opening;

at least one guide rail coupled to the front mounting bracket and the rear mounting bracket;

a slide plate attached to the guide rail in a manner to permit movement of the slide plate along the guide rail;

a deflector plate coupled to the slide plate, wherein the deflector plate moves in response to the movement of the slide plate along the guide rail;

control means for controlling the movement of the slide plate along the guide rail, wherein the movement of the slide plate permits the position of the deflector plate to be adjusted over the discharge opening; and wherein the rear mounting bracket is taller than the front mounting bracket such that the guide rail is located at an angle when to the front and rear mounting brackets are attached to the housing.

6. A safety device as claimed in claim 1, wherein the deflector plate is coupled to the slide plate by a hinge connection.

7. A safety device as claimed in claim 6, wherein the hinge connection is spring loaded.

8. A safety device as claimed in claim 1, further comprising a weight located on the deflector plate.

9. A safety device for mowing equipment including a housing having a discharge opening, said safety device comprising:

means for mounting at least one guide rail to the housing at a location adjacent the discharge opening;

a slide plate attached to the guide rail in a manner to permit movement of the slide plate along the guide rail;

a deflector plate coupled to the slide plate, wherein the deflector plate moves in response to the movement of the slide plate along the guide rail; and control means for controlling the movement of the slide plate along the guide rail, wherein the movement of the slide plate permits the position of the deflector plate to be adjusted over the discharge opening when the safety device is attached to the housing.

10. A safety device as claimed in claim 4, wherein the control means includes a control cable having one end attached to the slide plate and an opposite end attached to an operator control.

11. A safety device as claimed in claim 4, further comprising a bias spring mounted on each of the guide rails.

12. A safety device as claimed in claim 4, wherein the rear mounting bracket is taller than the front mounting bracket such that the guide rail is located at an angle when the front and rear mounting brackets are attached to the housing.

13. A safety device as claimed in claim 4, wherein the deflector plate is coupled to the slide plate by a hinge connection.

14. A safety device as claimed in claim 13, wherein the hinge connection is spring loaded.

15. A safety device as claimed in claim 4, further comprising a weight located on the deflector plate.

16. A safety device as claimed in claim 5, further comprising a bias spring mounted on the guide rail.

17. A mower comprising:

a housing having a discharge opening;

a motor coupled to the housing;

a cutting device coupled to the motor;

a front mounting bracket and a rear mounting bracket attached to the housing such that the front mounting bracket is adjacent to the discharge opening;

at least one guide rail coupled to the front mounting bracket and the rear mounting bracket;

a slide plate attached to the guide rail in a manner to permit movement of the slide plate along the guide rail;

a deflector plate coupled to the slide plate, wherein the deflector plate moves in response to the movement of the slide plate along the guide rail; and control means for controlling the movement of the slide plate along the guide rail, wherein the movement of the slide plate permits the position of the deflector plate to be adjusted over the discharge opening.

18. A mower comprising:

a housing having a discharge opening;

a motor coupled to the housing;

a cutting device coupled to the motor;

a front mounting bracket and a rear mounting bracket attached to the housing adjacent to the discharge opening;

at least two substantially parallel guide rails coupled to the front mounting bracket and the rear mounting bracket;

a slide plate attached to the guide rails in a manner to permit movement of the slide plate along the guide rails;

a deflector plate coupled to the slide plate, wherein the deflector plate moves in response to the movement of the slide plate along he guide rail; and control means for controlling the movement of the slide plate along the guide rails, wherein the movement of the slide plate permits the position of the deflector plate to be adjusted over the discharge opening when the safety device is mounted on the mowing equipment.

19. A mower comprising:

a housing having a discharge opening;

a motor coupled to the housing;

a cutting device coupled to the motor;

a front mounting bracket and a rear mounting bracket attached to the housing adjacent to the discharge opening;

at least one guide rail coupled to the front mounting bracket and the rear mounting bracket;

a slide plate attached to the guide rail in a manner to permit movement of the slide plate along the guide rail;

a deflector plate coupled to the slide plate, wherein the deflector plate moves in response to the movement of the slide plate along the guide rail;

control means for controlling the movement of the slide plate along the guide rail, wherein the movement of the slide plate permits the position of the deflector plate to be adjusted over the discharge opening; and wherein the rear mounting bracket is taller than the front mounting bracket such that the guide rail is located at an angle when the front and rear mounting brackets are attached to the housing.

20. A mower comprising:

a housing having a discharge opening;

a motor coupled to the housing;

a cutting device coupled to the motor;

means for mounting at least one guide rail to the housing at a location adjacent the discharge opening;

a slide plate attached to the guide rail in a manner to permit movement of the slide pate along the guide rail;

a deflector plate coupled to the slide plate, wherein the deflector plate moves in response to the movement of the slide plate along the guide rail; and control means for controlling the movement of the slide plate along the guide rail, wherein the movement of the slide plate permits the position of the deflector plate to be adjusted over the discharge opening.

* * * * *